United States Patent
Trish et al.

(10) Patent No.: US 9,139,213 B2
(45) Date of Patent: Sep. 22, 2015

(54) COMPUTING CART WITH SLIDING WORK SURFACE

(71) Applicant: Ergotron, Inc., St. Paul, MN (US)

(72) Inventors: Scott Trish, Lakeville, MN (US); Saeb Asamarai, Columbia Heights, MN (US)

(73) Assignee: Ergotron, Inc., St. Paul, MN (US)

( * ) Notice: Subject to any disclaimer, the term of this patent is extended or adjusted under 35 U.S.C. 154(b) by 65 days.

(21) Appl. No.: 13/754,424

(22) Filed: Jan. 30, 2013

(65) Prior Publication Data
US 2013/0200586 A1    Aug. 8, 2013

Related U.S. Application Data

(60) Provisional application No. 61/594,684, filed on Feb. 3, 2012.

(51) Int. Cl.
*B62B 3/00* (2006.01)
*A61G 12/00* (2006.01)

(52) U.S. Cl.
CPC ............... *B62B 3/00* (2013.01); *A61G 12/001* (2013.01)

(58) Field of Classification Search
CPC .......... B62B 3/00; B62B 3/002; B62B 3/005; B62B 2202/56; A61G 12/001; A47B 13/081; A47B 2200/0077
USPC ............ 280/79.3, 47.35; 108/143; 312/332.1, 312/333
See application file for complete search history.

(56) References Cited

U.S. PATENT DOCUMENTS

| | | | | | |
|---|---|---|---|---|---|
| 2,328,019 | A | * | 8/1943 | Jones | 312/194 |
| 2,576,385 | A | * | 11/1951 | Bigsby | 224/496 |
| 2,621,093 | A | * | 12/1952 | Merhige et al. | 108/45 |
| 2,664,331 | A | * | 12/1953 | Glotfelter | 312/194 |
| 3,899,982 | A | * | 8/1975 | Fetzek | 108/25 |
| 3,910,659 | A | * | 10/1975 | Peterson | 312/226 |

(Continued)

FOREIGN PATENT DOCUMENTS

| | | |
|---|---|---|
| JP | 2015509029 A | 3/2015 |
| WO | 03013307 A1 | 2/2003 |

(Continued)

OTHER PUBLICATIONS

International Search Report and Written Opinion, dated Mar. 13, 2013 for PCT Application No. PCT/US2013/023864, 9 pages.

(Continued)

*Primary Examiner* — Katy M Ebner
(74) *Attorney, Agent, or Firm* — Schwegman Lundberg & Woessner, P.A.

(57) ABSTRACT

Embodiments of the invention provide, among other things, computing carts with a storage compartment having a sliding work surface that selectively provides access to at least a portion of a storage space within the storage compartment. In some cases the storage space is defined at least in part by a storage chassis and a sliding work surface positioned over the storage chassis, with the sliding work surface at least in part defining a top extent of the storage space. In some cases a latch mechanism releasably maintains a sliding work surface in a closed position and allows movement to an open position when released. Some embodiments include a lock mechanism to secure a sliding work surface in a closed position to prevent access to a storage space. Strengthening mechanisms may also be provided to strengthen the storage compartment in the open and/or closed positions.

12 Claims, 9 Drawing Sheets

(56) References Cited

U.S. PATENT DOCUMENTS

| | | | | |
|---|---|---|---|---|
| 4,030,788 | A | * | 6/1977 | Bleeker .................. 312/333 |
| 4,600,255 | A | * | 7/1986 | Dubarko .................. 312/333 |
| 4,736,689 | A | * | 4/1988 | Stanko ....................... 108/5 |
| 4,792,174 | A | * | 12/1988 | Shioda .................. 296/37.12 |
| 4,931,978 | A | | 6/1990 | Drake et al. ............. 361/679.2 |
| 4,976,450 | A | * | 12/1990 | Ellefson .................. 280/79.11 |
| 5,002,293 | A | * | 3/1991 | Gottselig ................ 280/47.35 |
| 5,058,911 | A | * | 10/1991 | Hunter et al. .......... 280/47.35 |
| 5,092,652 | A | * | 3/1992 | Macaluso .................. 297/146 |
| 5,269,545 | A | * | 12/1993 | Huebschen et al. ...... 280/47.35 |
| 5,290,058 | A | * | 3/1994 | Adams et al. .............. 280/651 |
| 5,363,774 | A | * | 11/1994 | Anada et al. .............. 108/143 |
| 5,607,213 | A | * | 3/1997 | Slivon et al. .............. 312/301 |
| 5,697,686 | A | * | 12/1997 | Miller et al. .............. 312/194 |
| 6,493,220 | B1 | * | 12/2002 | Clark et al. ............ 361/679.41 |
| 7,029,080 | B2 | * | 4/2006 | Barry et al. ................ 312/333 |
| 7,106,014 | B1 | * | 9/2006 | Mastalir et al. .............. 318/280 |
| 7,111,852 | B2 | * | 9/2006 | Woods et al. ............ 280/47.34 |
| 7,188,847 | B1 | * | 3/2007 | Friedman ................ 280/47.35 |
| 7,232,195 | B2 | * | 6/2007 | Yang ......................... 312/333 |
| 7,487,978 | B2 | * | 2/2009 | Tutmaz et al. ............ 280/47.38 |
| 7,540,243 | B2 | * | 6/2009 | George et al. ............. 108/50.01 |
| 7,630,791 | B2 | * | 12/2009 | Nguyen et al. .............. 700/242 |
| 8,109,527 | B2 | * | 2/2012 | Bustle et al. .............. 280/47.35 |
| 8,210,548 | B1 | * | 7/2012 | Agyemang ............... 280/47.35 |
| 8,215,650 | B2 | | 7/2012 | Arceta |
| 8,596,655 | B2 | * | 12/2013 | Belanger et al. ........... 280/47.35 |
| 8,662,605 | B2 | * | 3/2014 | McRorie et al. ............ 312/276 |
| 2005/0065820 | A1 | | 3/2005 | Mallett et al. |
| 2005/0280228 | A1 | * | 12/2005 | Fernandes et al. ......... 280/47.35 |
| 2006/0103278 | A1 | * | 5/2006 | Bousquet .................. 312/332.1 |
| 2007/0228680 | A1 | * | 10/2007 | Reppert et al. ............ 280/47.35 |
| 2009/0319079 | A1 | * | 12/2009 | Arceta et al. ................ 700/228 |
| 2011/0272901 | A1 | * | 11/2011 | Inderbitzin ................... 280/29 |
| 2011/0272902 | A1 | | 11/2011 | Arceta et al. |
| 2012/0245731 | A1 | * | 9/2012 | Reckelhoff .................. 700/243 |

FOREIGN PATENT DOCUMENTS

| | | |
|---|---|---|
| WO | 2004076604 A2 | 9/2004 |
| WO | 2009158642 A1 | 12/2009 |

OTHER PUBLICATIONS

Ergotron® User Guide StyleView® SV41 Cart with Laptop Mount, Product Sheet, Nov. 2012, 15 pages.

Ergotron® StyleView: Everywhere Point-of-Care, Product Sheet, Nov. 3, 2010, 8 pages.

Ergotron® StyleView® EMR Laptop Cart, SV40, Product Sheet, Oct. 6, 2010, 7 pages.

Ergotron® StyleView® Cart, Product Sheet, Dec. 26, 2008, 2 pages.

Ergotron® HD-2 Series Cart, Product Sheet, Apr. 2, 2004, 2 pages.

Ergotron StyleView® Carts, Product Sheet, Apr. 10, 2008, 2 pages.

StyleView® Carts, Product Sheet, Sep. 26, 2007, 4 pages.

Ergotron® StyleView® Carts, Product Sheet, Nov. 2, 2006, 2 pages.

Ergotron® StyleView® Carts, Product Sheet, Aug. 24, 2009, 4 pages.

Ergotron® StyleView® Carts, Product Sheet, Jan. 14, 2005, 2 pages.

"European Application Serial No. 13703299.1 Response filed Apr. 1, 2015 to Rules 161(1) and 162 EPC mailed Oct. 10, 2014", With the amended claims, 12 pgs.

"European Application Serial No. 13703299.1, Amendment filed Aug. 28, 2014", 13 pgs.

"European Application Serial No. 13703299.1, Office Action mailed Oct. 10, 2014", 2 pgs.

"International Application Serial No. PCT/US2013/023864, International Preliminary Report on Patentability mailed Aug. 14, 2014", 8 pgs.

\* cited by examiner

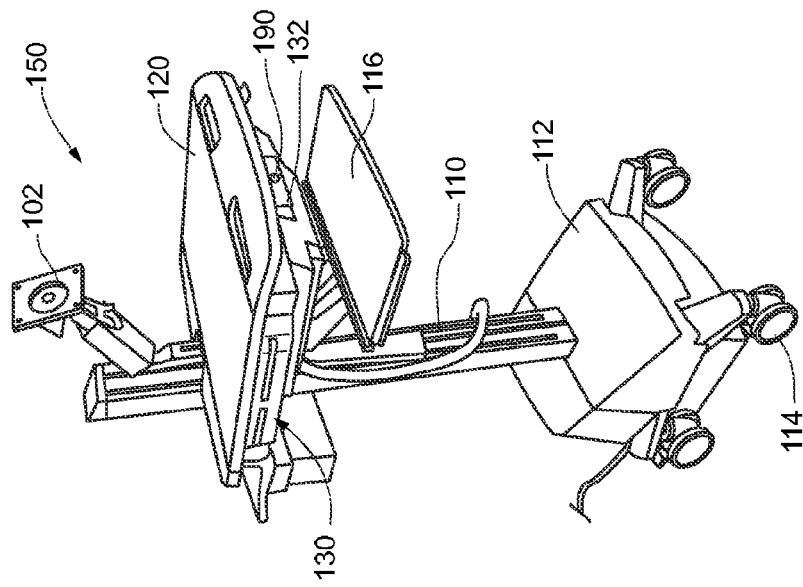
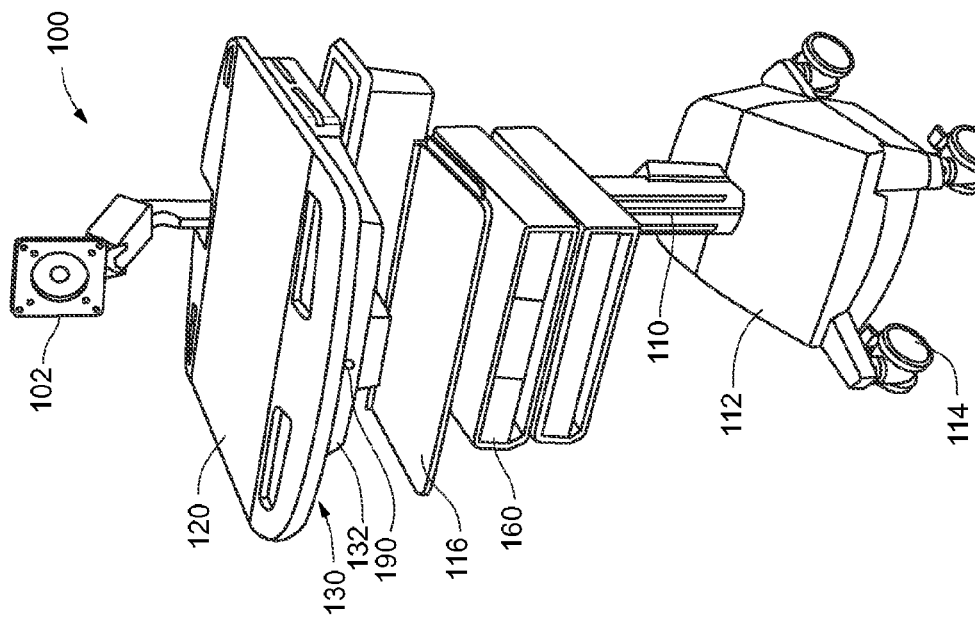

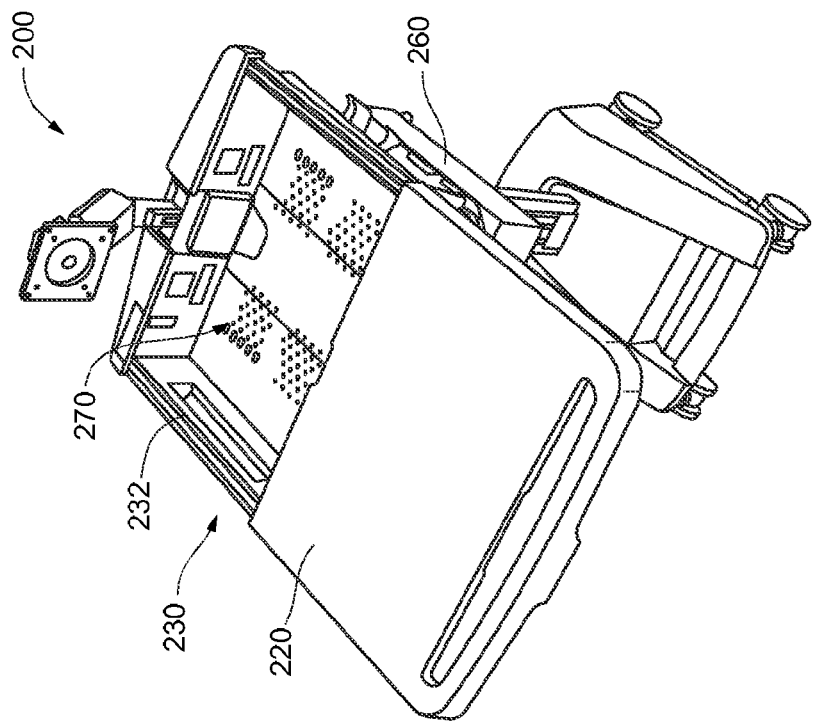
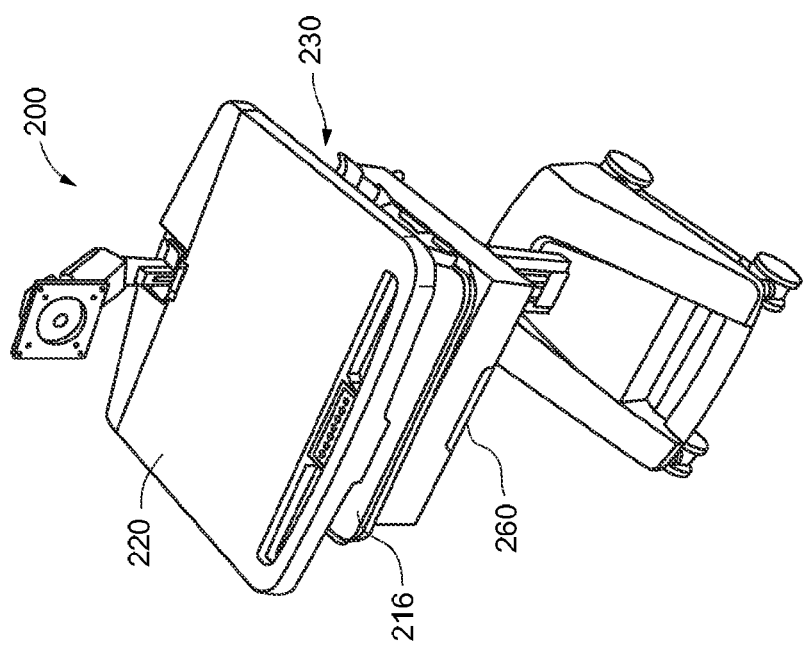

COMPUTING CART WITH SLIDING WORK SURFACE

CROSS-REFERENCES

This application claims the benefit of U.S. Provisional Application No. 61/594,684, filed Feb. 3, 2012, the content of which is hereby incorporated by reference in its entirety.

FIELD

This disclosure generally relates to systems and methods for computing carts.

BACKGROUND

Computing carts are used to provide portable computing capabilities to workers in a variety of settings. One example includes computing carts used by health care professionals in a hospital or clinic setting. Another example includes computing carts used by teachers in a school setting. In many cases a computing cart generally includes a wheeled base that supports a computer as well as a number of other items, including for example, storage compartments, drawers, work surfaces, keyboards and pointing devices and associated trays, electronic display(s), and other items.

In some cases a computing cart generally includes a storage compartment positioned under a work surface. The storage compartment is configured to store a computer, such as a desktop or slim PC or a laptop or notebook. Users occasionally need to access the computer to perform certain functions, such as to turn the computer off and on. However, during normal use, the storage compartment is often locked to secure the computer or other equipment that might be stored in the storage compartment.

SUMMARY

Some embodiments of the invention include a computing cart with a storage compartment that is formed at least in part by a storage chassis and a sliding work surface in sliding engagement with the storage chassis. In some embodiments, the sliding work surface is attached to the chassis above a storage space sized to securely house equipment such as a computer. In certain embodiments, the work surface may be locked during normal use. In some cases when unlocked, the work surface can slide forward to provide access to the storage space and the equipment inside.

Some embodiments of the invention provide a computing cart that comprises a base supporting a storage compartment. The base includes a number of wheels to provide the cart with portability. The storage compartment includes a storage chassis defining at least part of a storage space and a work surface in sliding engagement with the storage chassis over the storage space. The sliding engagement between the work surface and the storage chassis provides the work surface with an open position that provides access to at least part of the storage space. The sliding engagement also provides the work surface with a closed position that denies access to the at least part of the storage space.

According to some embodiments, a computing cart is provided that includes a base comprising a plurality of wheels, a support column extending from the base, and a storage compartment coupled to the support column. The storage compartment includes a storage space, a storage chassis comprising a bottom surface at least partially defining a bottom extent of the storage space, and a work surface. The work surface is positioned above the storage chassis and at least partially defines a top extent of the storage space. The storage compartment also includes a slide mechanism having a first component fixed to the storage chassis and a second component fixed to the work surface. The first component is slidingly engaged with the second component thereby providing the work surface with an open position and a closed position. In the open position the work surface provides access to at least part of the storage space, while in the closed position the work surface denies access to the at least part of the storage space.

In some embodiments one or more methods for operating a computing cart may be provided. One method for operating a computing cart that is provided in some embodiments includes approaching a computing cart that has a base with wheels, a support column extending from the base, and a storage compartment coupled to the support column. The storage compartment includes a storage space, a storage chassis at least partially defining the storage space, and a work surface in sliding engagement with the storage chassis over the storage space. The method also includes sliding the work surface over the storage space into a closed position and thereby denying access to the storage space. The method also includes sliding the work surface away from the storage space into an open position to provide access to the storage space.

These and various other features and advantages will be apparent from a reading of the following detailed description.

BRIEF DESCRIPTION OF THE DRAWINGS

The following drawings illustrate some particular embodiments of the present invention and therefore do not limit the scope of the invention. The drawings are not to scale (unless so stated) and are intended for use in conjunction with the explanations in the following detailed description. Some embodiments will hereinafter be described in conjunction with the appended drawings, wherein like numerals denote like elements.

FIGS. 1A and 1B are perspective views of computing carts in accordance with embodiments of the invention.

FIGS. 2A and 2B are perspective views of a computing cart with a work surface in a closed position and an open position, respectively, in accordance with an embodiment.

DETAILED DESCRIPTION

Figure 3:
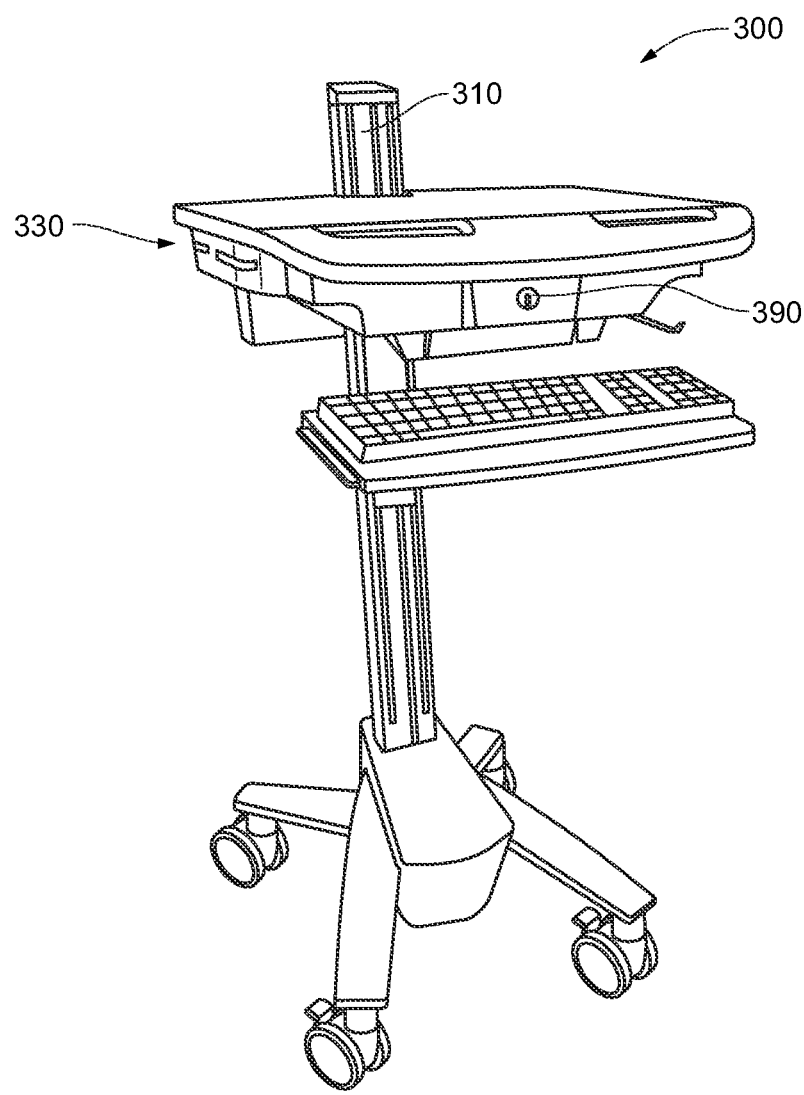
FIG. 3 is a perspective view of a computing cart in accordance with an embodiment.

The following detailed description is exemplary in nature and is not intended to limit the scope, applicability, or configuration of the invention in any way. Rather, the following description provides some practical illustrations for implementing some embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

FIGS. 1A-4B are perspective views of a variety of different computing carts provided according to some embodiments of the invention. FIGS. 1A and 1B depict examples of a computing carts 100, 150 that include an electronic display mount 102 (e.g., in this case a VESA interface) that enables the carts 100, 150 to support an electronic display such as a computer monitor. The electronic display mount 102 is generally coupled to a support column 110, which in turn extends upward from a base 112 with four wheels 114. In this embodiment the wheels 114 are provided as casters. Each cart also includes a keyboard tray 116 for supporting a computer keyboard. According to some embodiments the support column 110 can include a lift mechanism, which provides vertical adjustment of the computing cart.

The carts 100, 150 further include a work surface 120 providing, in these examples, a top-most surface for use by an operator of the cart. As shown in FIGS. 1A-1B, the display mount 102 locates an attached electronic display relative to the work surface 120, in this case above and proximate the rear of the work surface 120. Each cart 100, 150 also includes a storage compartment 130 formed by the work surface 120 and a storage chassis 132 coupled to the support column 110 and positioned underneath the work surface 120. The storage compartment 130 can be useful for storing computers and other equipment, including a desktop or slim PC that is operatively connected to a display attached to the mount 102 and a keyboard supported by the keyboard tray 116.

As will be appreciated, computing carts can be fitted with a number of different features and accessories that may vary depending on the desired use. For example, the cart 100 includes two drawer modules 160 for storing items, while the cart 150 does not include drawer modules. FIGS. 2A-2B depict another example of a computing cart 200 similar in many respects to the carts 100, 150 shown in FIGS. 1A-1B, but outfitted with a single drawer module 260 below a keyboard tray 216. FIGS. 2A-2B also illustrates a storage compartment 230 formed by a work surface 220 in sliding engagement with a storage chassis 232 according to some embodiments of the invention. As shown, the work surface 220 can slide between a closed position shown in FIG. 2A and an open position shown in FIG. 2B. In this example, the work surface 220 provides access to a storage space 270 within the storage compartment when it is moved into the open position, and denies access to the storage space 270 in the closed position.

Figure 4B:
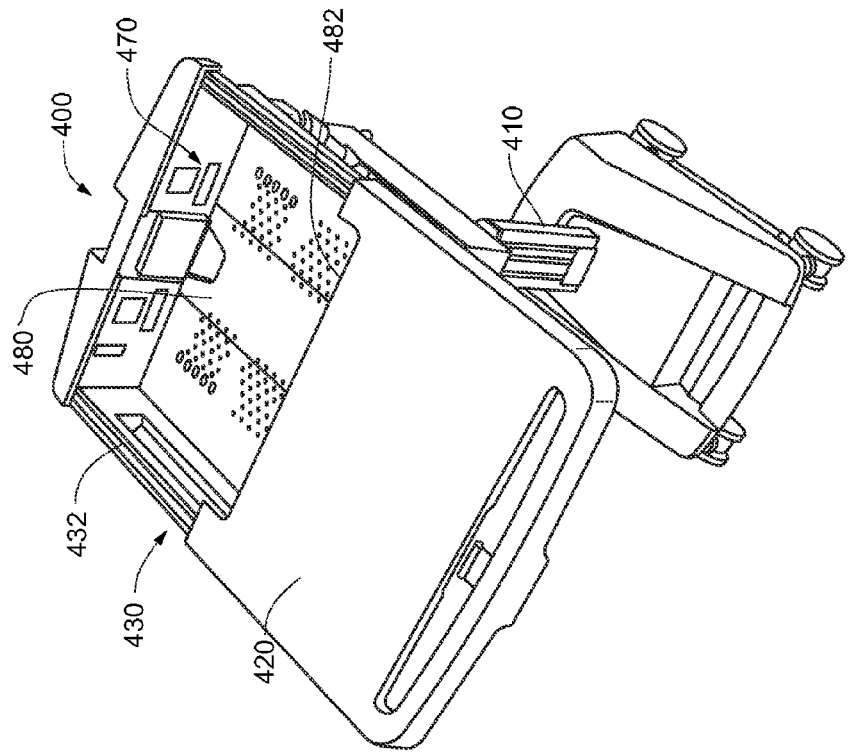
FIGS. 4A and 4B are perspective views of a computing cart with a work surface in a closed position and an open position, respectively, in accordance with an embodiment.
Figure 4A:
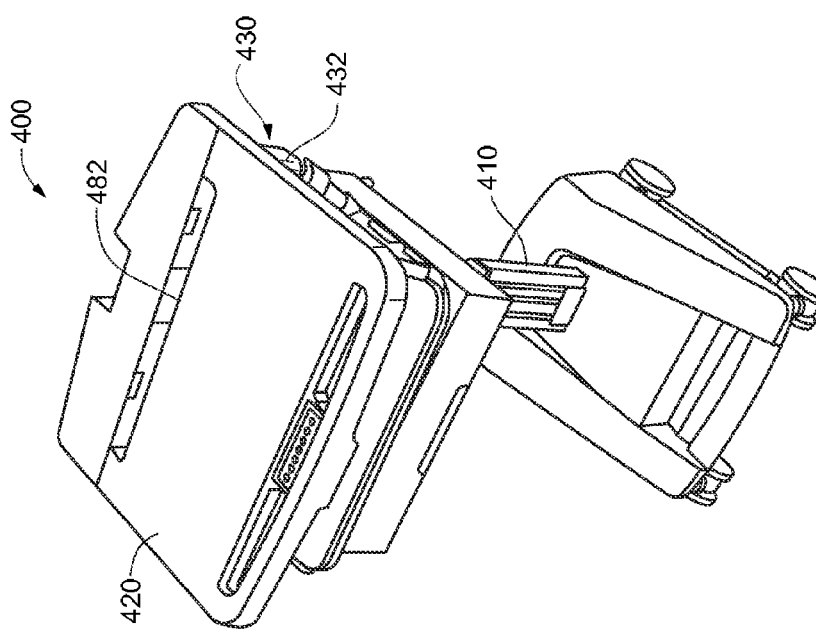

FIGS. 3 and 4A-4B depict further examples of computing carts according to some embodiments. As can be seen, the computing cart 300 shown in FIG. 3 and the computing cart 400 shown in FIGS. 4A-4B have a number of similarities in common with the carts 100, 150, and 200 shown in FIGS. 1A, 1B, and 2 which will not be discussed further. In addition, each of the carts 300, 400 is generally configured to store a laptop computer (e.g., notebook or notebook computer) within a respective storage compartment 330, 430 coupled to a support column 310, 410. Turning to FIGS. 4A and 4B, the storage compartment 430 is formed from a storage chassis 432 and a sliding work surface 420 that is slidingly engaged with the chassis. As seen in FIG. 4B, in this example the storage chassis 432 has a bottom support surface 480 that can support a laptop computer in a generally horizontal orientation near the rear of the storage compartment 430. The work surface 420 also includes a cutout 482 in the rear edge of the work surface that allows a laptop display screen to extend above the work surface 420 when in the closed position (FIG. 4A).

Thus, a cart operator can use the cart 400 with a laptop computer by sliding the work surface 420 into the open position (FIG. 4B), positioning the laptop on the bottom surface 480 within the storage space 470, flipping up the laptop display screen, and then sliding the work surface 420 into the closed position (FIG. 4A). The operator can then use the laptop computer within the storage compartment 430 while still viewing the laptop display screen, which extends from below the work surface 420, through the cutout 482, and above the work surface 420.

Turning back to FIGS. 1A and 1B, and also referring to FIG. 3, in some embodiments a cart may include a locking mechanism 190, 390 that allows a user to lock the position of the work surface and thus secure the storage compartment. According to some embodiments, a method for operating a computing cart can include the use of such a locking mechanism. For example, in some embodiments a method for operating a computing cart includes approaching a computing cart such as one of the carts shown in FIGS. 1A-4B and sliding the work surface extending over the storage space into a closed position to cover the storage space and thereby deny access to the storage space. The method then involves locking the work surface in the closed position, thus securing the storage compartment and any contents, such as a computer. To access the computer, or other contents of the storage space, an authorized operator can unlock the work surface from the closed position and then slide the work surface into the open position to access the computing device.

Figure 5A:
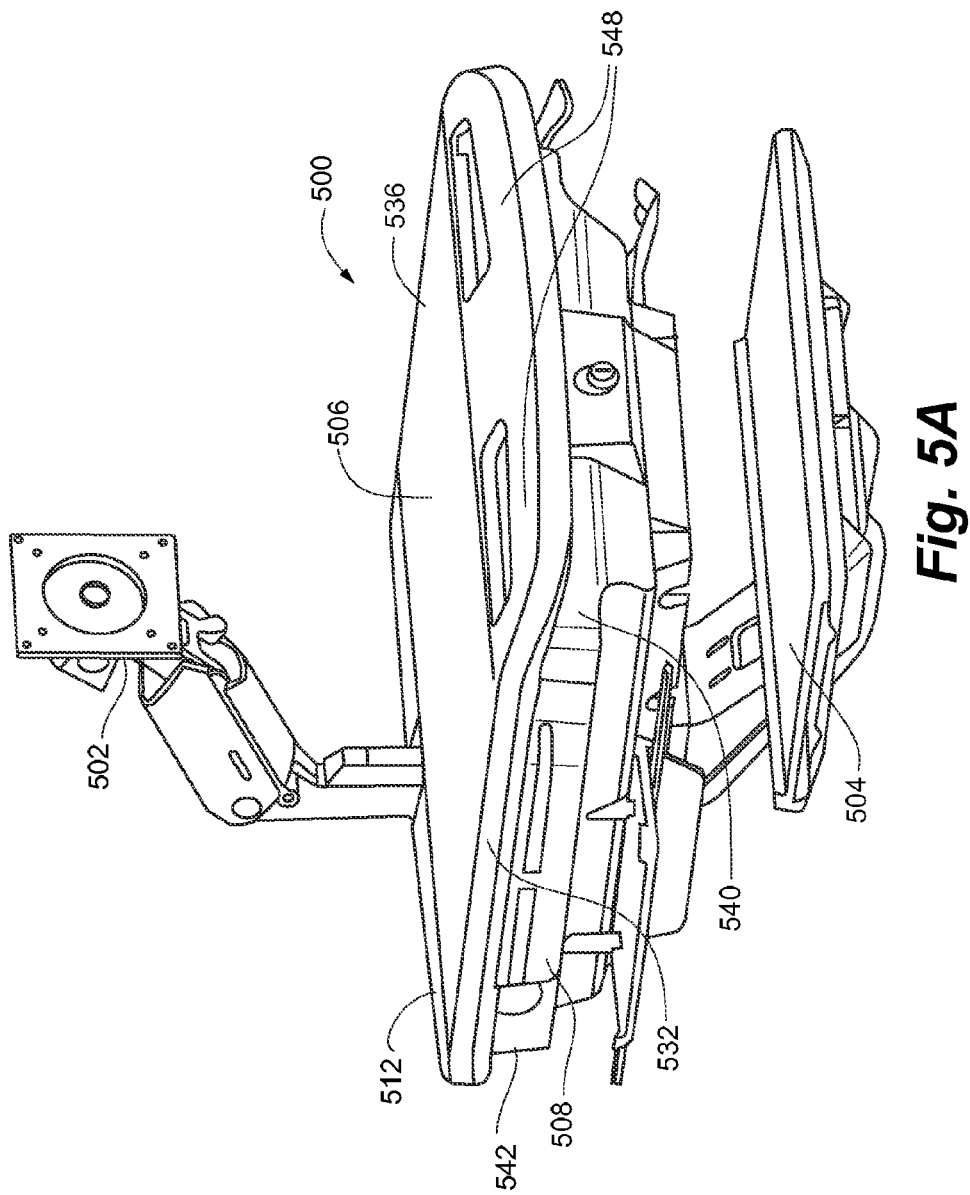
FIG. 5A is a perspective view of a top portion of a computing cart with a work surface shown in a closed position in accordance with an embodiment of the invention.

FIGS. 5A-8B depict portions of another computer cart in greater detail according to some embodiments of the invention. FIG. 5A is a perspective view of part of a computing cart, including a storage compartment 500, a display mount 502 coupled to the storage compartment 500, and a keyboard tray 504 coupled to the storage compartment 500 in accordance with one embodiment. As with the examples shown in FIGS. 1A-4A, the storage compartment 500, display mount 502, and keyboard tray 504 can be coupled to and supported by a wheeled base via a support column or other support member. The storage compartment 500 shown in FIG. 5A is generally formed by a work surface 506 positioned above a storage chassis 508.

Figure 5B:
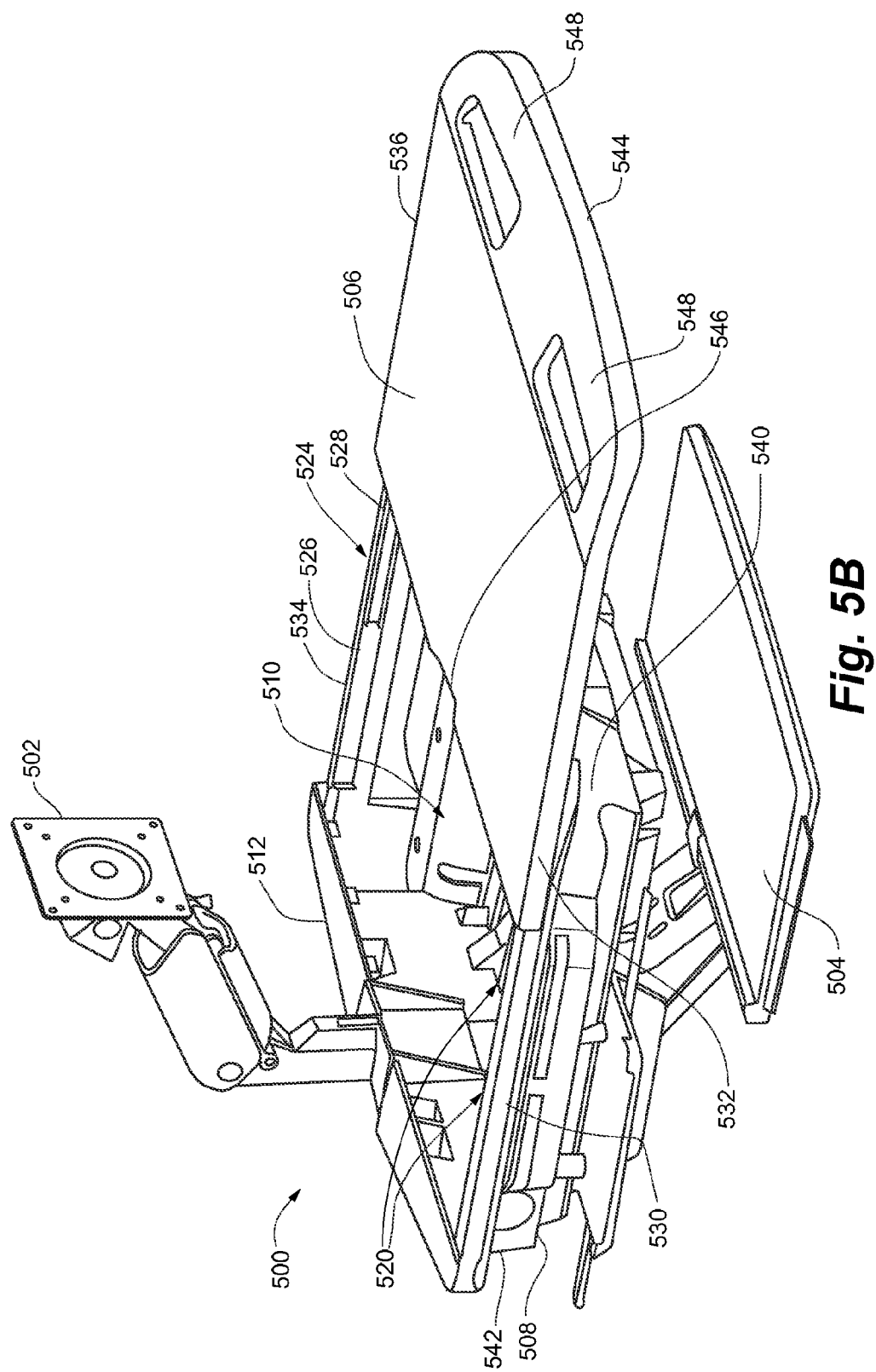
FIG. 5B is a perspective view of the top portion of the cart of FIG. 5A with the work surface shown in an open position in accordance with the embodiment.

Turning to FIG. 5B, in this example the work surface 506 and the storage chassis 508 define the extents of a storage space 510 located within the storage compartment 500. According to some embodiments, the storage chassis 508 defines at least part of the storage space 510, and the work surface 506 defines another portion of the storage space 510. In the depicted embodiment, for example, the storage chassis 508 includes side surfaces and a bottom surface that define the extent of the storage space 510 in those directions. Similarly, the work surface 506 in this example includes a planar configuration that defines the top extent of the storage space 510 when the work surface 506 is in a closed position as shown in FIG. 5A.

Of course, while the example shown in FIGS. 5A-5B illustrates the storage chassis 508 with a generally box-shaped or rectangular form substantially closed on approximately every side except the top, it should be appreciated that a wide variety of shapes and configurations are possible for the storage chassis, as well as the work surface, which could correspond with differently shaped storage spaces. As just one example, the storage space 510 within the storage compartment could be a subdivided space within the storage compartment 500 such that not every exterior surface of the storage chassis 508 defines an extent of the space. As a further example, the work surface in some cases may not necessarily be flat across the entire surface or may not extend across the entire top of the storage chassis 508. Referring to FIG. 5B, in this embodiment the storage compartment 500 includes a rear cover 512 that is attached to the storage chassis 508 near the rear of the chassis. The rear cover 512 engages with the work surface 506 in the closed position as shown in FIG. 5A. Thus, the rear cover 512 is above a portion of the storage chassis 508 and in this case defines the top extent of the storage space 510 in that location. As another example, in some embodiments, the storage chassis defines at least part of the storage space within a storage compartment and the work surface defines a top extent of the storage space in at least one location.

Continuing with reference to FIG. 5B, the work surface 506 is in sliding engagement with the storage chassis 508 over the storage space 510. In a general sense, the sliding engagement can be provided by a slide mechanism that includes at least a first component fixed to the storage chassis and at least a second cooperating component fixed to the work surface. The first and second components are slidingly engaged to provide the work surface with the open position shown in FIG. 5B that provides access to at least part of the storage space, and to provide the work surface with the closed position shown in FIG. 5A that denies access to at least part of the storage space.

As shown in FIGS. 5A-5B, in the illustrated example a slide mechanism includes two slides 520, 524 positioned near the side edges of the storage chassis and the side edges of the work surface 506. Each slide 520, 524 includes cooperating components that are fixed opposite each other between the storage chassis and work surface to provide the sliding engagement. For example, the embodiment shown in FIG. 5B includes a first slide 520 that includes a track (not shown) attached to the storage chassis 508 near one of its side edges 530 and a cooperating track (not shown) attached to the underside of the work surface 506 near the corresponding side edge 532 of the work surface 506. Similarly, the second slide 524 includes a track 526 attached to the storage chassis 508 near the opposite side edge 534 and a cooperating track 528 attached to the underside of the work surface 506 near the corresponding side edge 536 of the work surface 506.

Although one example of a slide mechanism has been described, it should be appreciated that a slide mechanism may have a different configuration, including a different number of slides (e.g., between one and many) and/or a different sliding engagement in some embodiments. In some cases a slide can be configured to provide sliding engagement with a plain bearing, a ball bearing, rollers, or any other suitable mechanism. In addition, as used herein to describe components of the slide mechanism with respect to the work surface and storage chassis, the term "fixed" is meant to include positive attachment of a component to the storage chassis or work surface and also an integral formation of the component in the storage chassis or work surface. Accordingly, a slide mechanism could be fixed thereto by attaching corresponding components of a ball-bearing slide to both the storage chassis and the work surface. In some embodiments, though, part of a slide may be formed directly in the chassis or work surface material, such as might be the case with a molded or machined groove forming a race for a bearing element.

Continuing with reference to FIGS. 5A-5B, in this embodiment the storage chassis 508 includes a front edge 540 and a rear edge 542, with the rear edge 542 generally positioned on the side of the chassis proximate the display mount 502 next to a location at which the storage chassis would normally be attached to a support column extending up from a base. Conversely, the front edge 540 is located opposite the storage space 510 from the rear end and is generally proximate the side the chassis 508 that would be approached by a person using the cart. In this example the work surface 506 can also be described in terms of a front edge 544 and a rear edge 546. As shown in FIG. 5B, the rear edge 546 of the work surface is configured to engage with the rear cover 512 that is attached to the storage chassis 508 near the rear edge 542 of the chassis. The front edge 544 of the work surface is configured with handles 548 for pulling the work surface and/or cart (e.g., when the work surface is locked in the closed position).

As shown in FIG. 5A (and also seen in the example in FIG. 2A), when the work surface 506 is in the closed position, in this embodiment the rear edge 546 of the work surface is proximate the rear edge 542 of the storage chassis 508 and the front edge 544 of the work surface 506 is proximate the front edge 540 of the storage chassis 508. In the open position shown in FIG. 5B (and also FIG. 2B), the rear edge 546 of the work surface is proximate the front edge 540 of the storage chassis 508 and the front edge 544 of the work surface extends out away from the front edge 540 of the storage chassis in a cantilevered configuration.

According to some embodiments, the sliding engagement provided between the storage chassis and the work surface of a storage compartment is limited to a range between the open position and the closed position. Thus, as shown in FIGS. 2A-2B, 4A-4B and 5A-5B, in each of these examples the work surface can slide forward from the closed position to the open position, but cannot slide backward in the opposite direction from the closed position. In some cases, the range of backward sliding is also limited by other structure, including for example, a rear cover portion over a portion of the storage chassis (e.g., cover 512 in FIGS. 5A-5B), an electronic display mount for a stand-alone display (e.g., display mount 502 in FIGS. 5A-5B), a support column and/or lift mechanism (e.g., support column 310 in FIG. 3), and/or the display screen of a laptop computer stored in the storage compartment with the screen flipped up (e.g., as in FIG. 4A).

Figure 6:
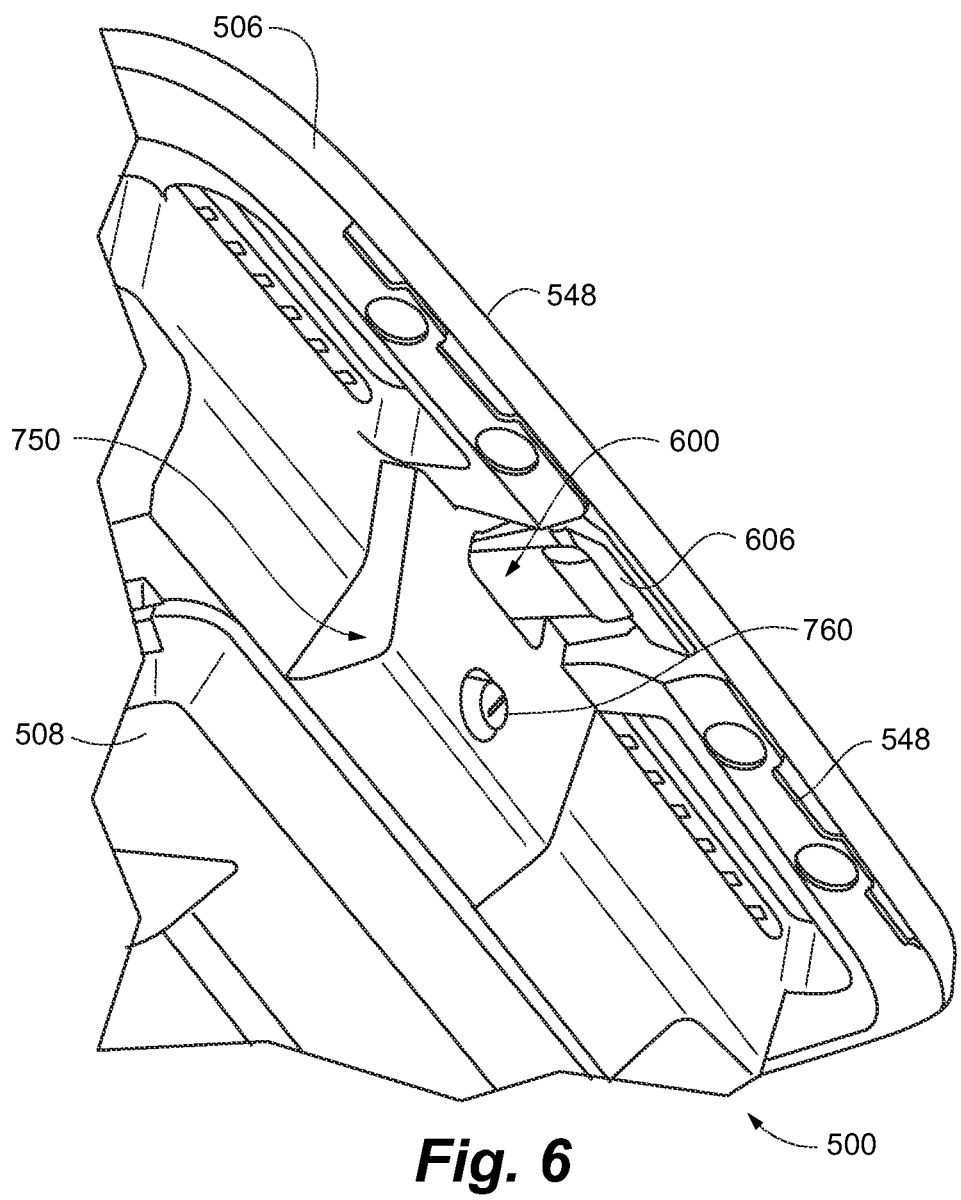
FIG. 6 is a partial perspective bottom view of the cart of FIG. 5A in accordance with the embodiment.
Figure 7:
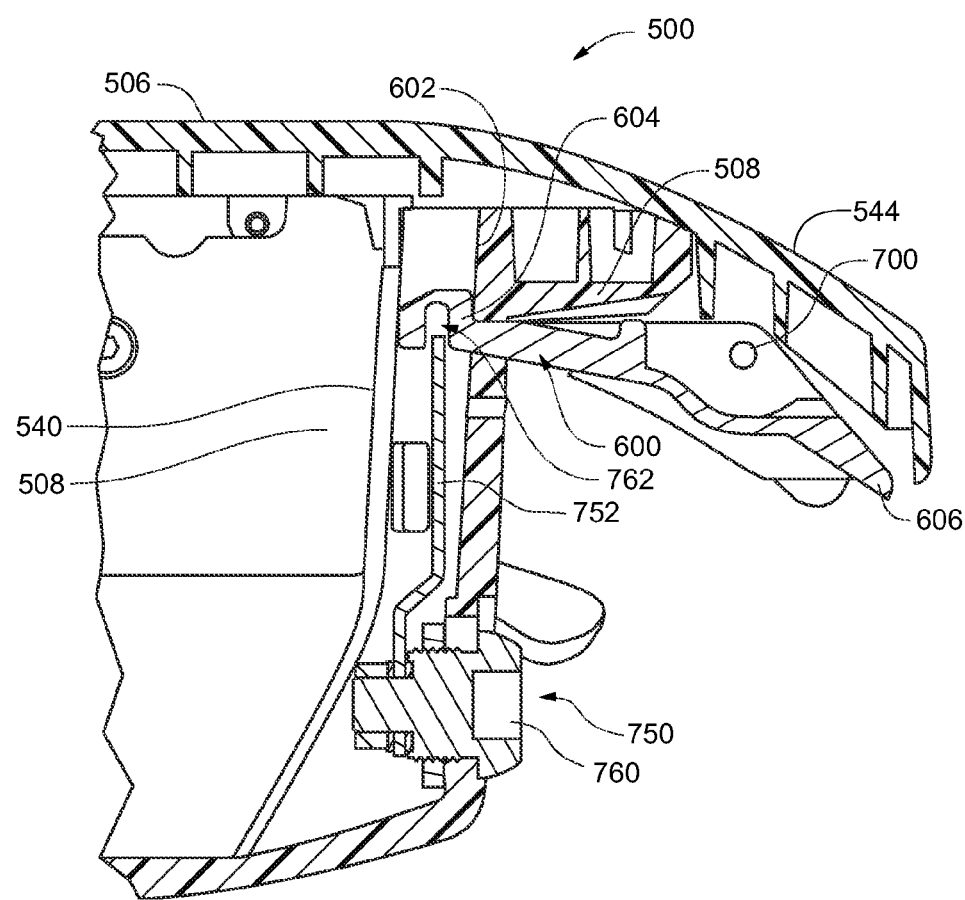
FIG. 7 is a partial cross-sectional view of a front of the cart of FIG. 5A with the work surface in a closed position in accordance with the embodiment.

As shown in FIGS. 6 and 7, in some embodiments a computer cart can include a latch mechanism 600 configured to maintain the work surface 506 in the closed position when latched. The latch mechanism 600 generally provides a latched state in which the work surface 506 is maintained in the closed position and an unlatched state in which the work surface 506 can be slid between the closed and open positions. In some cases the latch mechanism includes a first component fixed to the storage chassis 508 and a second component fixed to the work surface 506. For example, as shown in FIGS. 6 and 7, the latch mechanism 600 includes a stop 602 that is fixed (e.g., integrally formed) proximate the front edge 540 of the storage chassis. The latch mechanism 600 also includes a latching bar 604 coupled to the work surface 506 proximate the front edge 544 of the work surface. As is seen, the latching bar 604 is configured to releasably engage the stop 602, which thus releasably maintains the work surface in the closed position.

As shown in FIG. 7, the latching bar 604 in this example includes a front end 606 acting as a lever that allows a user to engage the rear end of the latching bar 604 with the stop 602. In this example, the latching bar 604 is movably fixed to the work surface 506 through a hinge 700, about which the latching bar 604 pivots up and down. In normal operating conditions, the rear end of the latching bar 604 is biased upward by a spring force provided by a spring. When the work surface 506 is in the closed position, the latching bar 604 is pulled upward and engages the stop 602 located on the chassis. In such embodiments, the work surface stays in a closed position when the latch is engaged with the stop feature. When the user wants to move the work surface to the open position, the user squeezes the front end of the latching bar 604 to disengage the latching bar 604 from the stop 602, thereby releasing the work surface 506 from the closed position and allowing it to be moved to the open position to provide access to the storage space 510 within the storage compartment 500.

According to some embodiments of the invention, a computing cart can be provided with a lock mechanism. For example, a work surface can be selectively lockable such that the work surface cannot be positioned in its open position without unlocking a lock, such as with a key. When unlocked, the work surface can slide forward to expose the storage space and the equipment inside. Accordingly, a lock mechanism can be used to secure the work surface in the closed position and thus secure access to the storage compartment and any equipment therein.

In general, a lock mechanism can provide a locked state and an unlocked state. In some embodiments the locked state is configured to maintain a latch mechanism in the latched state. An unlocked state can be configured to allow transition of the latch mechanism between the latched state and the unlatched state. For example, referring to FIGS. 6 and 7, the storage compartment 500 is provided with a lock mechanism 750 mounted proximate the front edge 540 of the storage chassis 508. The lock mechanism 750 includes a movable bracket 752 configured to engage the latching bar 604 to lock the latch mechanism 600, thereby locking the work surface 506 in the closed position. In addition, the movable bracket 752 can disengage from the latching bar 604 to unlock the latch mechanism 600 thereby enabling release of the latching bar 604 and sliding of the work surface 506. In the example illustrated in FIG. 7, the movable bracket 752 is moved into and out of engagement with the latching bar 604 by turning a key in a key lock mechanism 760. The key lock mechanism has selectable open and closed positions. When the key lock 760 is in the open position, the latching bar 604 functions as described above. In the embodiment shown, when the key lock 760 is moved to the closed position, the bracket 752 attached to the key lock 760 rotates up and engages a slot 762 located under the latching bar. In this position the bracket 752 prevents the latching bar 604 from being disengaged from the stop 602 on the chassis, thereby locking the storage compartment 500.

Figure 8A:
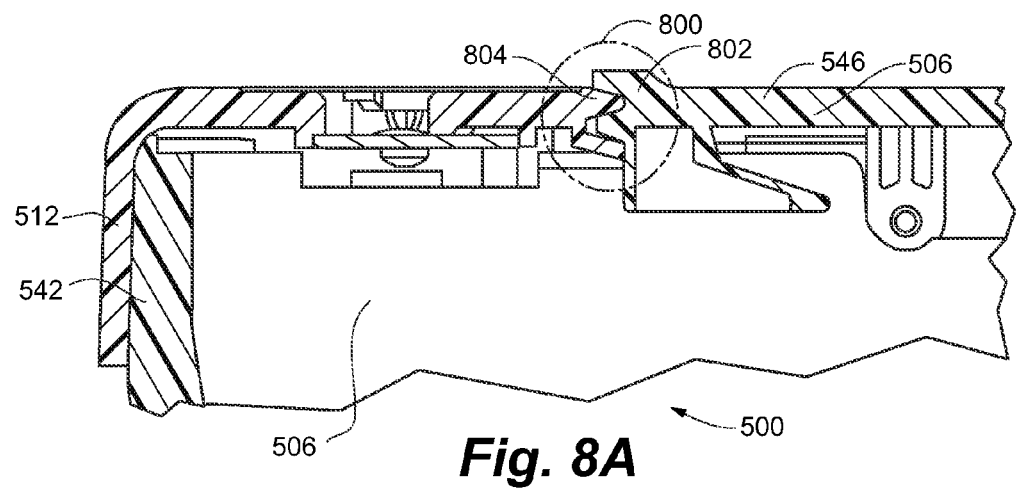
FIG. 8A is a partial cross-sectional view of a rear of the cart of FIG. 5A with the work surface in a closed position in accordance with the embodiment.
Figure 8B:
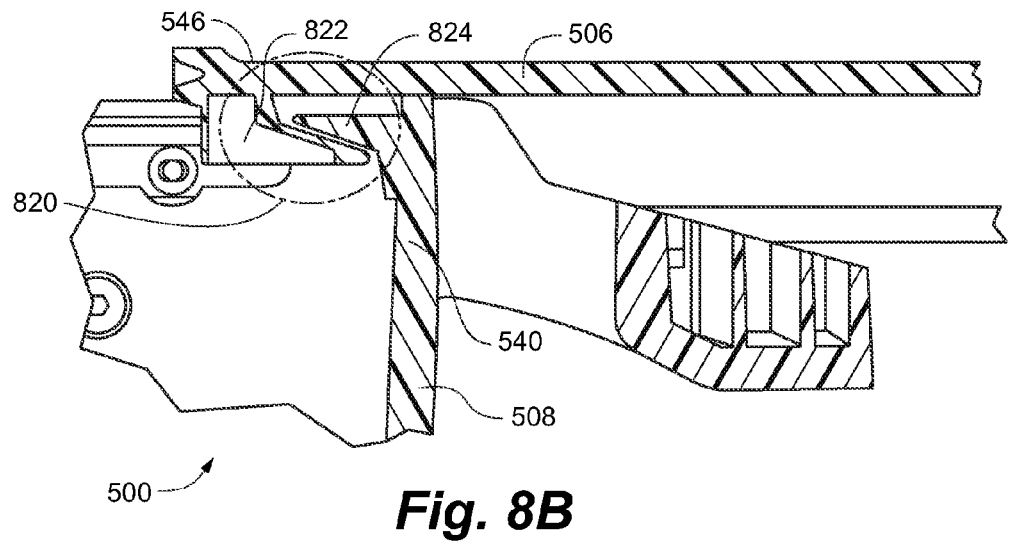
FIG. 8B is a partial cross-sectional view of a front of the cart of FIG. 5A with the work surface in an open position in accordance with the embodiment.

Turning now to FIGS. 8A and 8B, in some cases a storage compartment may include a strengthening mechanism that is configured to strengthen the engagement between a storage chassis and a work surface. For example, in some cases a strengthening mechanism can include cooperating strengthening members that interlock or otherwise fit together to reinforce the engagement between the storage chassis and the work surface. A strengthening mechanism can be located in any desirable position with respect to the storage chassis and the work surface. In some cases a strengthening mechanism may be located near the rear edges of the work surface and the storage chassis to reinforce the closed position, and/or near the rear edge of the work surface and the front edge of the storage chassis to reinforce the open position.

For example, the embodiment shown in FIG. 8A illustrates the use of a strengthening mechanism 800 on the storage compartment 500. The strengthening mechanism 800 includes strengthening members in the form of a first rib 802 fixed proximate the rear edge 546 of the work surface 506 and a second rib 804 fixed proximate the rear edge 542 of the storage chassis 508, in this case located along the mating edge of the rear cover 512. The first and second ribs 802, 804 are shaped to interlock when they meet in the closed position, thus providing multiple interference points between the rear cover 512 and the rear edge 546 of the work surface 506. The first and second ribs 802, 804 thus allow the work surface to be stronger and more difficult to penetrate when it is in the closed position.

Turning to FIG. 8B, in this case the storage compartment 500 includes a second strengthening mechanism 820. The second mechanism 820 includes a third rib 822 fixed proximate the rear edge 546 on the underside of the work surface 506 and a fourth rib 824 fixed proximate the front edge 540 of the storage chassis 508. The third and fourth ribs 822, 824 are shaped to interlock when they meet in the open position, thus providing multiple interference points between the rear edge 546 of the work surface 506 and the front edge 540 of the storage chassis. The third and fourth ribs 822, 824 thus provide additional strength for the work surface in the open position, which is desirable since the work surface is cantilevered in front of the storage chassis in the open position.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A computing cart, comprising:
 a base comprising a plurality of wheels; and
 a storage compartment supported by the base, the storage compartment comprising
  a storage chassis defining at least part of a storage space, wherein the storage chassis comprises a front edge and a rear edge;
  a work surface in sliding engagement with the storage chassis over the storage space, the sliding engagement providing the work surface with an open position providing access to at least part of the storage space and a closed position denying access to the at least part of the storage space, wherein the work surface comprises a front edge and a rear edge;
  wherein the storage space is configured to store equipment when the work surface is in either the open position or closed position; and
  a strengthening mechanism comprising a first component fixed with respect to the storage chassis and a second component fixed with respect to the work surface, the strengthening mechanism first component is located proximate to the rear edge of the storage chassis, the strengthening mechanism second component is located proximate to the rear edge of the work surface, wherein the strengthening mechanism first and the second components interlock with the work surface in the closed position thereby strengthening the engagement between the storage chassis and the work surface.

2. The computing cart of claim 1, wherein the work surface in the closed position defines a top extent of the storage space.

3. The computing cart of claim 1, further comprising a latch mechanism comprising a latched state configured to maintain the work surface in the closed position and an unlatched state configured to allow sliding of the work surface between the closed position and the open position.

4. The computing cart of claim 3, further comprising a lock mechanism comprising a locked state configured to maintain the latch mechanism in the latched state and an unlocked state configured to allow transition of the latch mechanism between the latched state and the unlatched state.

5. The computing cart of claim 1, comprising a strengthening mechanism third component located proximate to the front edge of the storage chassis; and
   wherein the strengthening mechanism second and third components interlock with the work surface in the open position thereby strengthening the engagement between the storage chassis and the work surface.

6. The computing cart of claim 1,
   wherein in the closed position the rear edge of the work surface is proximate the rear edge of the storage chassis and the front edge of the work surface is proximate the front edge of the storage chassis;
   wherein in the open position the rear edge of the work surface is proximate the front edge of the storage chassis and the front edge of the work surface extends out away from the front edge of the storage chassis in a cantilevered configuration; and
   wherein the sliding engagement between the storage chassis and the work surface is configured to limit sliding of the work surface to a range between the open position and the closed position.

7. A computing cart, comprising:
   a base comprising a plurality of wheels;
   a support column extending from the base; and
   a storage compartment coupled to the support column, the storage compartment comprising:
      a storage space;
      a storage chassis comprising a bottom surface at least partially defining a bottom extent of the storage space, wherein the storage chassis comprises a front edge and a rear edge;
      a work surface positioned above the storage chassis, the work surface at least partially defining a top extent of the storage space, wherein the work surface comprises front edge and a rear edge;
      a slide mechanism comprising a first component fixed to the storage chassis and a second component fixed to the work surface, the first component slidingly engaged with the second component thereby providing the work surface with an open position providing access to at least part of the storage space and a closed position denying access to the at least part of the storage space,
      wherein the storage space is configured to store equipment when the work surface is in either the open position or closed position,
      wherein in the closed position the rear edge of the work surface is proximate the rear edge of the storage chassis and the front edge of the work surface is proximate the front edge of the storage chassis,
      wherein in the open position the rear edge of the work surface is proximate the front edge of the storage chassis and the front edge of the work surface extends out away from the front edge of the storage chassis in a cantilevered configuration, and
      wherein the sliding engagement between the storage chassis and the work surface is configured to limit sliding of the work surface to a range between the open position and the closed position;
      a latch mechanism comprising a first component fixed to the storage chassis and a second component fixed to the work surface, the first and the second components configured to engage to a latched state and disengage to an unlatched state, wherein the first component of the latch mechanism comprises a stop fixed proximate the front edge of the storage chassis and the second component of the latch mechanism comprises a latching bar coupled to the work surface proximate the front edge of the work surface, the latching bar configured to releasably engage the stop to releasably maintain the work surface in the closed position; and
      a lock mechanism mounted proximate the front edge of the storage chassis, the lock mechanism comprising a movable bracket configured to engage the latching bar to lock the latch mechanism thereby locking the work surface in the closed position, the movable bracket further configured to disengage from the latching bar to unlock the latch mechanism thereby enabling release of the latching bar and sliding of the work surface.

8. The computing cart of claim 7, wherein the storage chassis comprises a first side edge and a second side edge;
   wherein the work surface comprises a first side edge and a second side edge;
   wherein the slide mechanism comprises a first slide and a second slide, each of the first and the second slides comprising first and second components in sliding engagement; and
   wherein the first component of the slide mechanism comprises corresponding first components of the first slide and the second slide and the second component of the slide mechanism comprises corresponding second components of the first slide and the second slide; and
   wherein the first slide first component is fixed proximate the storage chassis first side edge, the second slide first component is fixed proximate the storage chassis second side edge, the first slide second component is fixed proximate the work surface first side edge, and the second slide second component is fixed proximate the work surface second side edge.

9. The computing cart of claim 7, further comprising means for locating an electronic display relative to the work surface.

10. The computing cart of claim 9, wherein the means for locating the electronic display comprises a support surface within the storage space configured to support a laptop computer comprising the electronic display and a cutout in the rear edge of the work surface configured to allow the electronic display of the laptop computer to extend from below the work surface to above the work surface with the work surface in the closed position.

11. A computing cart, comprising:
    a base comprising a plurality of wheels;
    a support column extending from the base; and
    a storage compartment coupled to the support column, the storage compartment comprising:
       a storage space;
       a storage chassis comprising a bottom surface at least partially defining a bottom extent of the storage space, wherein the storage chassis comprises a front edge and a rear edge;
       a work surface positioned above the storage chassis, the work surface at least partially defining a top extent of the storage space, wherein the work surface comprises front edge and a rear edge;
       a slide mechanism comprising a first component fixed to the storage chassis and a second component fixed to the work surface, the first component slidingly engaged with the second component thereby providing the work surface with an open position providing access to at least part of the storage space and a closed position denying access to the at least part of the storage space, wherein the storage space is configured to store equipment when the work surface is in either the open position or closed position, wherein in the closed position the rear edge of the work surface is proximate the rear edge of the storage chassis and the front edge of the work surface is proximate the front edge of the storage chassis, wherein in the open position the rear edge of the work surface is proximate the front edge of the storage chassis and the front edge of the work surface extends out away from the front edge of the storage chassis in a cantilevered configuration, wherein the sliding engagement between the storage chassis and the work surface is configured to limit sliding of the work surface to a range between the open position and the closed position; and a first strengthening member fixed proximate the rear edge of the work surface and a second strengthening member fixed to the storage chassis, wherein the first and the second strengthening members are configured to interlock thereby strengthening engagement between the storage chassis and the work surface, wherein the first strengthening member comprises a first rib fixed proximate the rear edge of the work surface and the second strengthening member comprises a second rib fixed proximate the rear edge of the storage chassis, wherein the first and the second ribs are configured to interlock with the work surface in the closed position.

12. The computing cart of claim 11, further comprising a third strengthening member comprising a third rib fixed proximate the front edge of the storage chassis, wherein the first and the third ribs are configured to interlock with the work surface in the open position.

\* \* \* \* \*